United States Patent [19]

Seheidt et al.

[11] Patent Number: 5,375,169
[45] Date of Patent: Dec. 20, 1994

[54] CRYPTOGRAPHIC KEY MANAGEMENT METHOD AND APPARATUS

[75] Inventors: Edward M. Seheidt, McLean, Va.; John J. Crowley, Rockville, Md.

[73] Assignee: TECSEC, Incorporated, Vienna, Va.

[21] Appl. No.: 69,577

[22] Filed: May 28, 1993

[51] Int. Cl.⁵ .......................... H04L 9/08; H04L 9/28
[52] U.S. Cl. .......................................... 380/21; 380/2; 380/9; 380/28; 380/46; 380/49
[58] Field of Search ................ 380/2, 4, 9, 21, 23–25, 380/43, 49, 30, 46, 28

[56] References Cited

U.S. PATENT DOCUMENTS

| | | | |
|---|---|---|---|
| 4,218,582 | 8/1980 | Hellman et al. | 380/30 |
| 4,405,829 | 9/1983 | Rivest et al. | 380/30 |
| 4,417,338 | 11/1983 | Davida | 380/21 |
| 4,424,414 | 1/1984 | Hellman et al. | 380/30 |
| 4,649,233 | 3/1987 | Bass et al. | 380/21 |
| 4,850,017 | 7/1989 | Matyas, Jr. et al. | 380/21 |
| 4,876,716 | 10/1989 | Okamoto | 380/21 |
| 4,955,082 | 9/1990 | Hattori et al. | 455/33.3 |
| 5,136,642 | 8/1992 | Kawamura et al. | 380/21 |
| 5,150,411 | 9/1992 | Maurer | 380/30 |

OTHER PUBLICATIONS

Massey, *An Introduction to Contemporary Cryptology*, May 1988; "Proc,s of the IEEE"; vol. 76, No. 5; pp. 533–549.

Schneier, *Untangling Public-Key Cryptography*, May 1992; "Dr. Dobb's Journal", pp. 16–28.

*Primary Examiner*—Bernarr E. Gregory
*Attorney, Agent, or Firm*—Roberts & Associates

[57] ABSTRACT

A system for the secure communication of a message from a transmitting user to a receiving user using a split key scheme. Each user generates a key component using a cryptographic engine. The key component is a pseudorandom sequence of bits with an appended error detection field which is mathematically calculated based on the pseudorandom sequence. This key component is then sent out on a communications channel from the transmitting user to the receiving user. The receiving user also sends its key component to the transmitting user. Each location performs a mathematical check on the key component received from the other location. If the key component checks pass at both locations, the transmit key component and the receive key component, including the error detection fields, are combined at both locations, forming identical complete keys at both locations. The identical complete keys are then used to initiate the cryptographic engines at both locations for subsequent encryption and decryption of messages between the two locations.

15 Claims, 3 Drawing Sheets

CRYPTOGRAPHIC KEY MANAGEMENT METHOD AND APPARATUS

BACKGROUND OF THE INVENTION

1. Field of the Invention

The present invention relates generally to cryptographic systems and more particularly to a novel technique and apparatus for encrypting all forms of electronic communication without using a public key of any type.

2. Description of the Background Art

While the specter of "spies" eagerly trying to obtain the defense information of various countries is very much still present in the defense and intelligence community, an equally serious threat is now presented by technological or commercial "spies" who desire to obtain commercial and technical proprietary information from competing companies. These agents use sophisticated means similar to those used by the defense and intelligence community in order to obtain commercially valuable information that reveals the plans and commercial activities of competitors, allowing the aggressor company to obtain a competitive advantage in the marketplace. Theft of commercially valuable information is a very real and ever-present threat.

To combat this type of commercial spying, various complex systems have evolved to protect proprietary company information. These systems involve physical controls over personnel as well as over the data flowing in and out of a company. For example, most computer systems used within companies require a password to be entered before the system can be accessed. It is frequently the case that confidential or proprietary company information must be passed electronically from one location to another in order to convey that information within the company in a timely fashion. Such electronic communication is easily susceptible to interception if not protected in some form in addition to password protection.

Encryption of data is a critical requirement in denying access to confidential information from those who are not so authorized. Cryptographic systems have evolved to fill the needs of companies and individuals wanting to protect the proprietary commercial information of a company from competitors and from those who generally should not have that information. Cryptographic "keys" are an essential part of the information encryption process. The cryptographic key, or "key" for short, is a sequence of characters represented by bytes of information which is manipulated by a cryptographic algorithm to transform data from plain (readable) text to a series of unintelligible text or signals known as encrypted or cipher text. The key is then used by the receiver of the cipher text to decrypt the message back to plain text. However, for two people to communicate successfully using keys, each must use the same key or inverse keys to encrypt the message being sent and to decrypt that message when received, assuming that the same encryption/decryption algorithm is used on both ends of the communication.

Various methods have evolved to manage the distribution of keys, known as "key management". For two people to communicate securely using conventional cryptography, those two persons must not only possess compatible cryptographic equipment, they must also have identical keys. Further, those keys must be kept secret from anyone not in a position of confidence with the two communicators and must be changed periodically to guard against compromise. In addition to the protection of the keys themselves, selecting the proper key sequence and increasing the frequency with which the key sequence is changed can enhance the security of this type of protection. The function of key management is the process of generating, distributing, changing, replacing, storing, checking on, and destroying cryptographic keys. This is a critically important function.

Two major key management schemes have been developed over the years and are in use at the present time: classic pair-wise distribution and public key distribution. Both of these forms of key management have drawbacks. Distributing classic pair-wise key information is typically accomplished through the use of a courier service. The keys for a particular key time period, such as a day, an entire series of days, or any time period during which a particular key is valid, are delivered in printed, punch tape, electronic, or other form to a number of locations. Either a courier travels to all locations from a central key distribution site or couriers from the individual sites travel to a central location to pick up the keys. During any particular key time period, the same key is used by all cleared parties within the communications network, allowing messages to be encrypted and decrypted using that particular key. One drawback to the security of this type of distribution scheme is that it is based on trust. Any couriers used must be trusted, as they play an integral part of the authentication process. Also, to distribute keys effectively in a network requires that a matrix architecture be implemented to track user connectivity. The more subscribers to the network there are, the more complex the key matrix will be and the more difficult it is to maintain key management among changing users, since it is frequently the case that not everyone in a network will be using the same keys.

Sometimes more than one key is necessary in a classic key distribution scheme. In a single key system, anyone within a network who has the key is privy to any communication within the network. If one member of the network wants to transmit a communication to only one other particular member, the single key will afford him no protection from others in the network because everyone within the network shares the same key and can decrypt the message. Likewise, if someone wants to communicate a message to a subset of the network, that is, to a particular group within the network, the single key would provide her with no extra security. In these and other cases, multilevel key access, or multiple keys, would provide a solution, albeit one that is quite unwieldy, inflexible, and difficult to manage by a key administrator. The cost of maintaining this matrix of keys, using the courier service, and risking the possibility that the courier system may be compromised are major drawbacks that have led to the creation of a modified classic distribution scheme.

The modified classic distribution scheme also uses a courier for key distribution. However, the courier does not deliver the keys that are used to encrypt the files. Instead, the courier delivers a distribution key which is used to encrypt other keys that are in turn used to encrypt the files. In this way, the courier alone cannot compromise the network. This scheme offers the advantage of allowing the changing of the file key more frequently than in the classic scheme previously described.

The disadvantage of the modified classic distribution scheme is that a compromise of the distribution key is far more serious than in the ordinary classic scheme since a compromise affects a collection of file keys and therefore a larger base of protected files.

A method that has evolved to overcome some of these problems involves a public key distribution scheme. Such a public key distribution scheme is disclosed in U.S. Pat. No. 4,218,582 to Hellman et al. A public key cryptographic system employs more than one key for encryption and decryption of messages or data. One of the keys is private and only held by two parties or a subgroup of parties within a network. The other key is public, that is, available to everyone within the network. All communications within the network are encrypted using the public key. In addition, the private key is used to further encrypt messages between two parties or within a subgroup of the network. Confidentiality of the message is preserved since no one without the private key can decipher the message. In public key cryptography, the public and private keys are generated by an algorithm based on a discrete exponential function, the arithmetic of which is computed in modulo P, where P is a very large prime number. The security of such a system rests on the fact that one key is privately held, and that it is computationally infeasible to determine the resulting discrete logarithmic function without knowledge of the private key. One drawback of the public key system is that the algorithm must be based on a very large prime number in order to ensure the integrity of the communication. Primitive elements of the algorithm must satisfy a particular relationship with the prime number. Such primitive elements are known to always exist, but limit and complicate the task of implementing the algorithm.

An alternative to the public key system is a private key system known as a symmetric key system which is a cryptographic system using the same key for both encryption and decryption. This key is transmitted from the sender to the receiver over a secure channel in parallel with the encrypted message. One particular symmetric key system is known as the data encryption standard or "DES" which is published by the National Institutes of Science and Technology. The DES was originally specified for the encryption of sensitive government information unrelated to national security. The DES uses a sixty-four byte key, fifty-six of which are independent bytes and eight bytes which may be used for parity checking. The DES was first publishing in January 1977 in FIPS-PUB-46 which is available from the National Technical Information Service.

U.S. Pat. No. 4,405,829 to Rivest et al. discloses an example of a product key system. A product key system is implemented using a succession of simple keys, each of which adds a small amount of encryption that does not provide sufficient practical security. The cumulative effect of the application of successive keys, however, provides adequate secure encryption for a transmitted message. Like the algorithm used in public systems, the key in the Rivest et al. system is based on an exponential function and prime number relationships. U.S. Pat. No. 4,424,414 to Hellman et al. also discloses a cryptographic system utilizing an exponential function.

SUMMARY OF THE INVENTION

It is therefore an object of the present invention to provide a message encryption/decryption scheme that ensures secure communication between parties.

It is and additional object of the present invention to avoid the problems inherent in classic pair-wise key management, that is the need for a person such as a courier to be in a position of trust to distribute the keys.

It is a further object of the present invention to avoid the complex key management task that exists when many users are on a network, each of whom require different pairs of keys in order to communicate with one another without everyone on the network being privy to the communication.

It is another object of the present invention to provide a simpler key creation mechanism which is not based on prime number relationships.

It is still a further object of the present invention to provide a message encryption/decryption scheme in which key management is simplified by leaving most of the key generation, distribution, storage, and destruction tasks to the parties to the communication.

It is yet an additional object of the present invention to provide a message encryption/decryption scheme which is flexible in its use options, allowing any two persons or small groups of people to communicate securely apart from other members of a shared network.

The present invention is a system, including apparatus and method, for the secure communication of a message from a transmitting user to a receiving user using a split key scheme. The message may be voice, data, or any other signal in digital form, or may be an analog signal that has been digitized by an method known to those skilled in the art. Each user generates a key component using a cryptographic engine. The key component generated by the cryptographic engine is a pseudorandom sequence of bits of a particular length with an appended error detection field which is mathematically calculated based on the pseudorandom sequence. A maximal length sequence is preferred.

This key component is then sent out on a communications channel from the transmitting user having a cryptographic engine to the receiving user also having a cryptographic engine. In addition, the receiving user sends its key component to the transmitting user. The cryptographic engines are a part of digital logic circuitry located at the transmitting and receiving locations. In the preferred embodiment, this digital logic circuitry is embodied on a number of integrated circuit (IC) chips for security reasons. Alternatively, the digital logic circuitry may be located on a single IC at each location. Chips at both locations perform both key generation and key checking operations.

The chip at the receive location runs the appropriate mathematical check on the key component received from the transmit location, comparing the error detection fields with a test error detection sequence. If there is a match, communication is enabled. If there is no match, communication is not enabled. Likewise, the chip at the transmit location checks the error detection field of the key component received from the receive location.

Once a match is established at both locations, the transmit key component and the receive key component, including the error detection fields, are combined at both locations, forming identical complete keys at both locations.

In this way, both locations have a bit sequence which is a combination of the bit sequence from the transmit location and the bit sequence from the receive location. This combination of bit sequences can be done in any mathematical fashion which is non associative and commutative between the pseudorandom sequences and the error detection fields. The identical complete keys are then used to initiate the cryptographic engines at both locations for subsequent encryption and decryption of messages between the two locations. Since both cryptographic engines are substantially identical and since they are both keyed or started using the same bit sequence, the engines can both encrypt and decrypt information sent between the two locations.

If communication is broken and subsequently reestablished, a different key is established for the next communication session using the procedure previously described.

One advantage of the system of the present invention is that any known mathematical error detection function can be used to produce the error detection field from the pseudorandom sequence. In the preferred embodiment of the present invention, a cyclic redundancy code or "CRC" is used. Security and privacy of information is achieved without the use of a large computational effort, as is required by the prime number schemes of public key and other systems. Further, there is no need for making available public keys to a large group of people. Thus, the present invention avoids the problems associated with the public key system as well as the complexity associated with classic pair-wise key management techniques by providing a secure split key system.

DETAILED DESCRIPTION

The present invention is a secure communication system that uses a key to encrypt messages being transmitted from a transmit location to a receive location. The key is split between the two parties to the communication, or among all the parties if more than two parties are communicating. Each party to the communication generates a component of the key and each passes the key component to other parties to the communication previous to transmission of the message. These components are then combined by each party to form the complete key.

Figure 1:
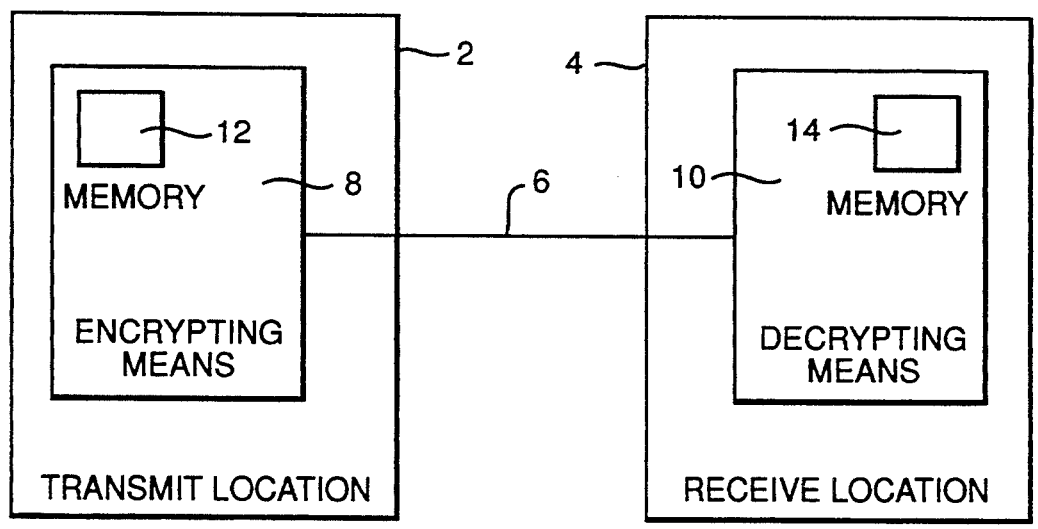
FIG. 1 shows a block diagram of the system of the present invention.

Referring to FIG. 1, a block diagram of an example system of the present invention, used by two communicating parties, is shown. The transmit location 2 and the receive location 4 are linked by a communications channel 6. Each location is also equipped with logic means for generating, checking, storing, and combining key components and for transmitting, receiving, and storing key components, complete keys, and messages. At the transmit location 2, this logic means is an encrypting means 8 and at the receive location 4 this logic means is a decrypting means 10. The encrypting means 8 and the decrypting means 10 are coupled to the communications channel 6. Key components, complete keys, and mathematical algorithms are stored in memory means 12 and 14 in the encrypting and decrypting means.

Thus, the present invention utilizes digital logic circuitry at each location, preferably with the circuitry divided among a number of integrated circuit chips for added security, although an alternative embodiment can have the digital logic resident on a single chip. In either embodiment, the circuitry can be custom designed to suit the users' purposes and the design captured on a programmable logic circuit (PLC). An example of such a PLC is the PIC 17C42-16L PLCC manufactured by Microchip, Inc. of Chandler, Ariz., the characteristics of which are incorporated herein by reference.

Figure 2:
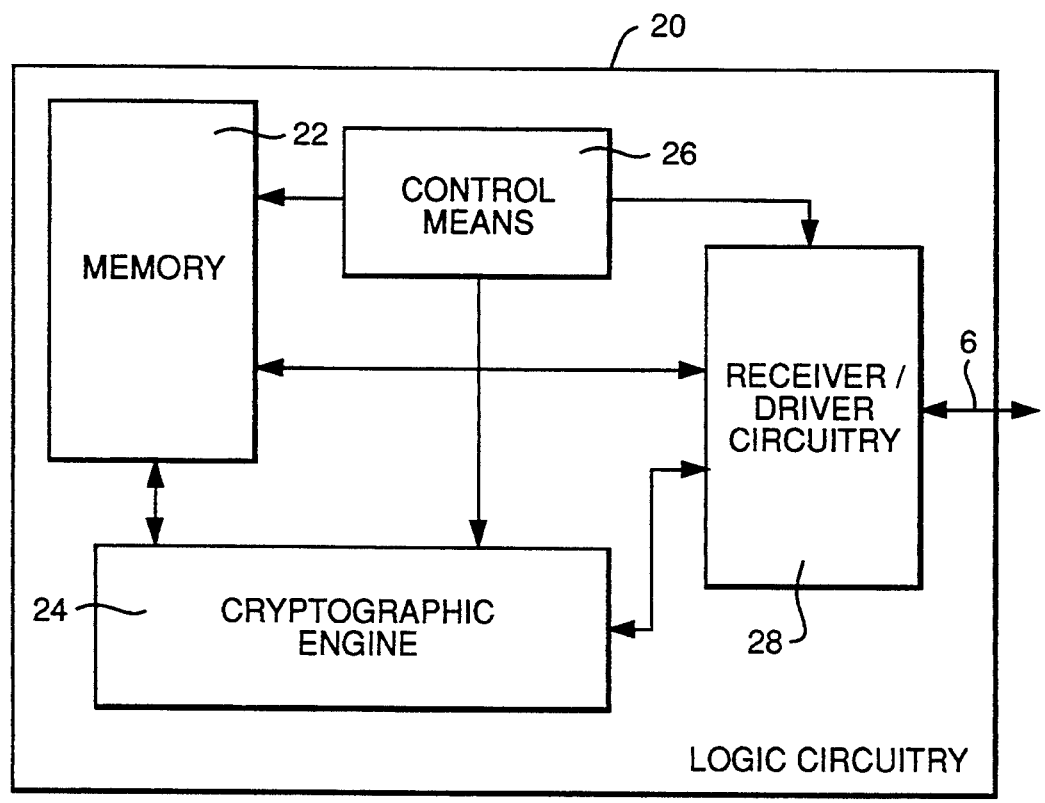
FIG. 2 shows a block diagram of the logic circuitry resident at one communication location.

Referring to FIG. 2, a block diagram of the logic circuitry 20 of the encryption and decryption means is shown by way of example. This logic circuitry 20 includes memory 22, a cryptographic engine 24 that generates the key component for that location, control means 26 for controlling the operation of the cryptographic engine and memory, and receiver/driver circuitry 28 connected to the communications channel and to the memory 22, cryptographic engine 24, and control means 26. The control means 26 is connected to the memory 22 and cryptographic engine 24, and the memory 22 and cryptographic engine 24 are connected for transferring data to be processed. The cryptographic engine 24 generates a pseudorandom sequence of bits of information of a length specified by the particular system utilizing the cryptographic engine 24. The pseudorandom sequence is generated using known pseudorandom sequence generating means within the cryptographic engine 24, for example, through the use of serial shift registers having selected outputs modulo-2 added and fed forward. A field of check bits is appended to the pseudorandom sequence as an error detection field. This error detection field is another sequence of bits of a certain length that is generated in accordance with a mathematical algorithm applied to the pseudorandom sequence, by means known to those skilled in the art. For example, the error detection field may be a cyclical redundancy check (CRC) field, which is a well known type of error detection sequence commonly in use in communications systems protocols. The sequence formed by the pseudorandom sequence and the appended error detection field of check bits is the actual key component for that location.

Figure 3A:
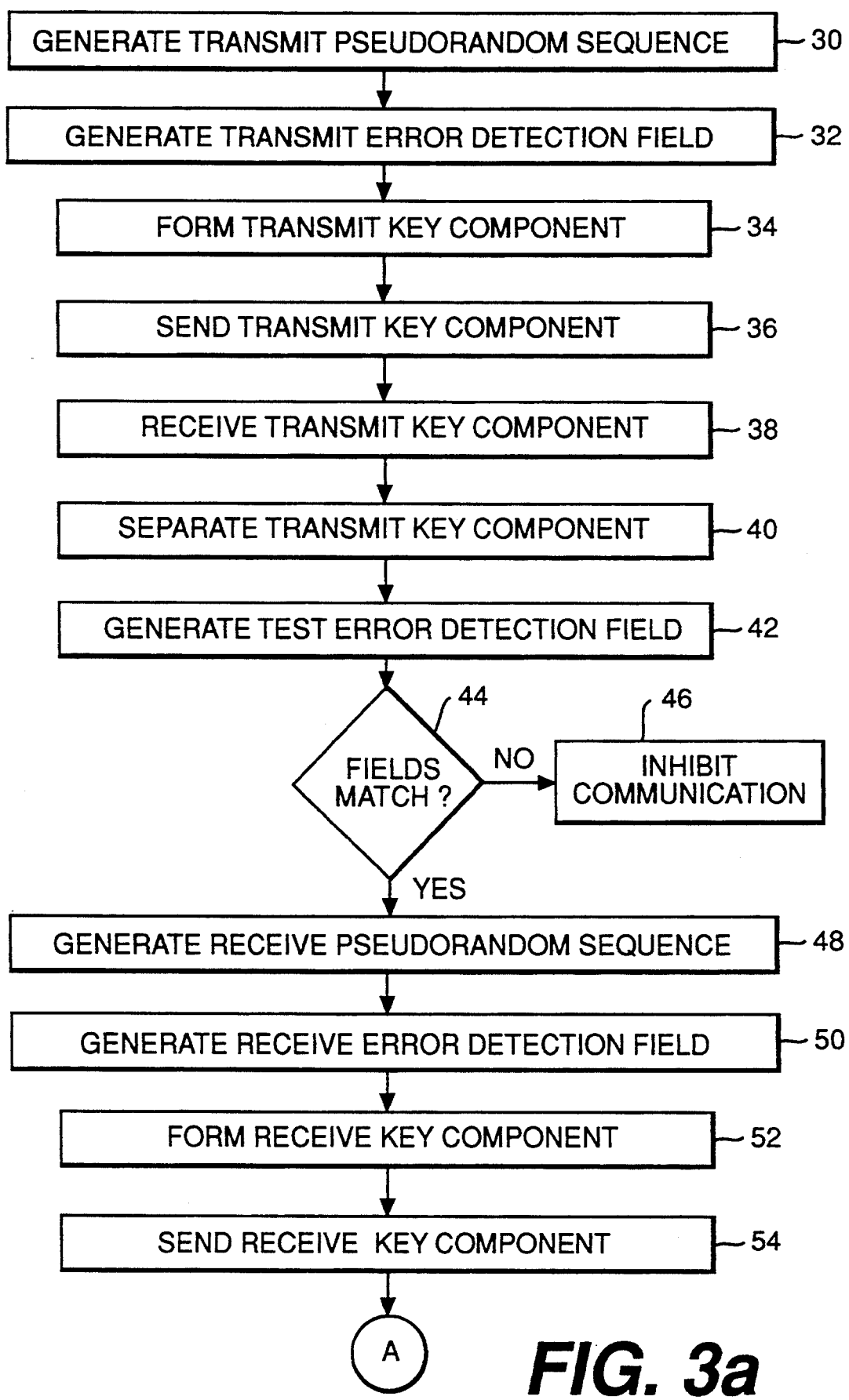
FIGS. 3a and 3b show a logic flow diagram of the method of communication employed by the system of the present invention.
Figure 3B:
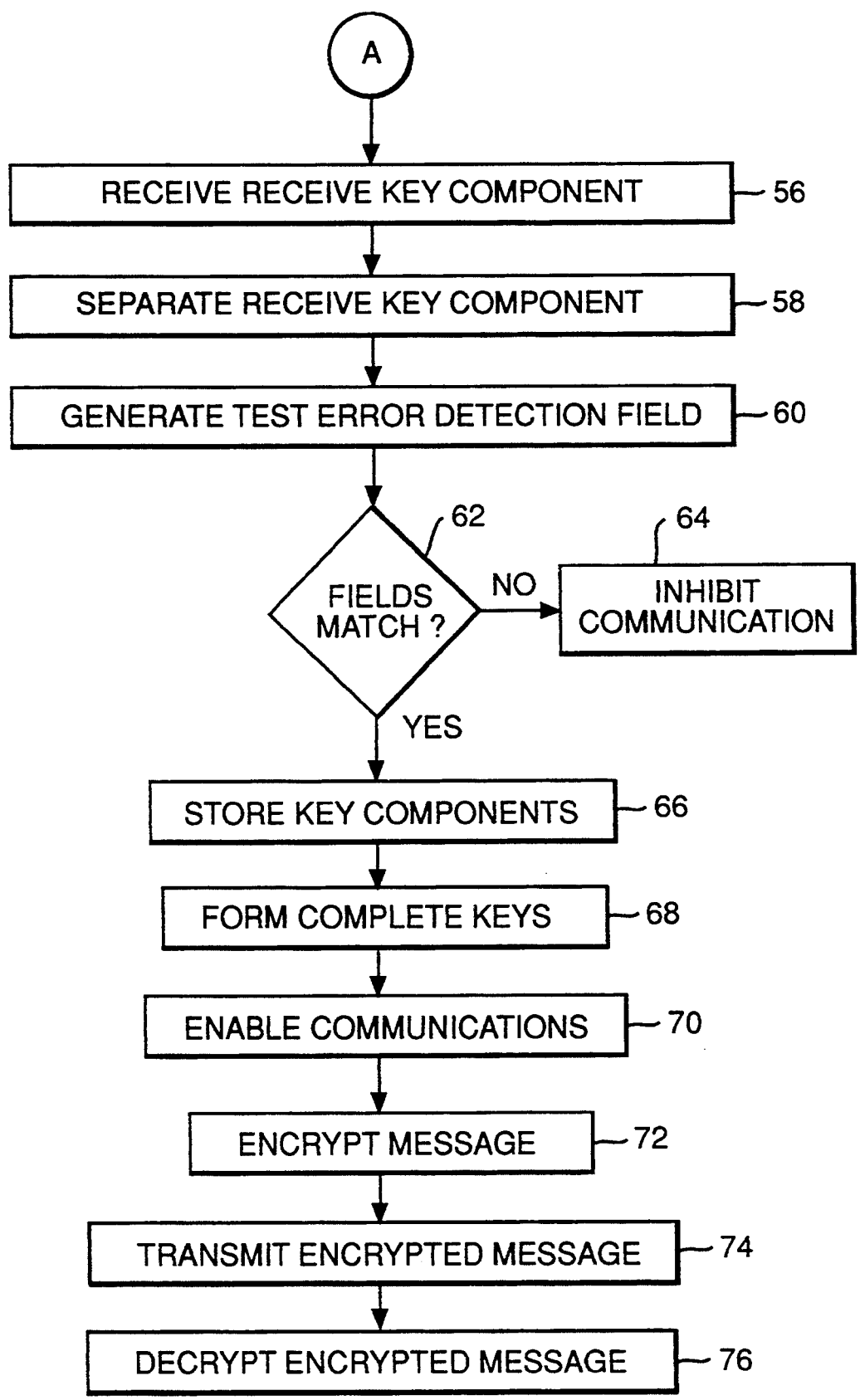

Referring to FIGS. 3a and 3b, a flow diagram of the method of communication employed by the system of the present invention is shown. A message, a transmit mathematical algorithm, and a receive mathematical algorithm are stored in transmit memory. When the message is being transmitted from a transmit location to a receive location, the transmit cryptographic engine, which is part of the encrypting means, will generate 30 a transmit pseudorandom sequence. The transmit pseudorandom sequence generation and all operation of the transmit cryptographic engine and transmit memory are performed under control of a transmit controller. A transmit error detection field will then be generated 32 based on the transmit mathematical algorithm applied to the transmit pseudorandom sequence. The transmit error detection field is then appended to the transmit pseudorandom sequence, forming 34 the complete transmit key component. The transmit location transmits 36 the transmit key component to the receive location. The transmit key component is also stored in the memory located on the transmit chip.

The receive location has a receive cryptographic engine which is part of the decrypting means and which is substantially identical to the transmit cryptographic engine at the transmit location. The receive location also includes receive memory for storing a receive mathematical algorithm and a transmit mathematical algorithm. This receive cryptographic engine receives 38 the transmit key component from the transmit location, stores it in receive memory, and separates 40 the transmit error detection field from the transmit pseudorandom sequence, based on knowledge of the length of the transmit pseudorandom sequence. This key component separation and all other operation of the receive cryptographic engine and receive memory are performed under the control of a receive controller. The receive cryptographic engine, functioning as a transmit key component checking means, uses the same transmit mathematical algorithm used by the transmit cryptographic engine to generate 42 a test error detection field based on the transmit pseudorandom sequence. Because the same mathematical algorithm is used, the sequence of test bits composing the test error detection field generated by the receive cryptographic engine will match the transmit error detection field generated by the transmit cryptographic engine, absent transmission errors or tampering by outside sources. The receive chip therefore compares 44 the test error detection field generated by the receive cryptographic engine with the transmit error detection field to determine the validity and transmission accuracy of the transmit key component. If the error detection fields do not match, that is, are not identical, communication between the transmit location and the receive location is inhibited 46. If the error detection fields match, the receive location stores the transmit key component in memory located in the receive chip and generates 48 its own key component using its cryptographic engine.

In order to generate a receive key component, the receive cryptographic engine performs the same types of steps that the transmit cryptographic engine performs in generating the transmit key component. The receive cryptographic engine first generates 48 a receive pseudorandom sequence of bytes using known pseudorandom sequence generating techniques. This receive pseudorandom sequence may be of the same length as the transmit pseudorandom sequence, but is not necessarily so. The receive cryptographic engine then generates 50 a receive error detection field based on the receive pseudorandom sequence and a receive mathematical algorithm which may be the same as the transmit mathematical algorithm but is not necessarily so. The receive error detection field is then appended to the receive pseudorandom sequence to form 52 the receive key component, which is stored in memory located on the receive chip.

The receive key component is sent 54 to the transmit location, where the transmit cryptographic engine, functioning as a receive key component checking means, receives 56 the receive key component, separates 58 the receive pseudorandom sequence from the receive error detection field, generates 60 a test error detection field based on the receive pseudorandom sequence and the receive mathematical algorithm, and compares 62 the sequence of test bits composing the test error detection field to the receive error detection field. If the error detection fields are not identical, communication between the encrypting means and the decrypting means is inhibited 64. If the comparison results in a match, the receive key component is considered to be valid, accurately transmitted, and untampered, and is stored 66 in transmit memory located on the transmit chip.

Once the key components have been validated at both the transmit and receive locations, the key components stored in memory at both locations are combined 68 to form the complete key. This combination may take place in any known manner. For example, the key components may be serially appended. Alternatively, the key components may be modulo-2 added on a bit by bit basis to form a completely new sequence. Any other combination method may be employed by the combining means at each location.

The complete key at the transmit location is identical to the complete key at the receive location. Once both locations have a complete, validated key stored in memory, communication between the locations is enabled 70. The actual message to be communicated is manipulated with the complete key by the transmit encryption engine so that it is unintelligible, that is, the message is encrypted 72 by converting the message to encrypted text. The encrypted message is then transmitted 74 on the communications channel to the receive location, where it is stored in memory and decrypted 76 by the receive encryption engine by converting the received encrypted text back to a plain text message using the same complete key. When decryption is complete, the message is readable to a person at the receive location.

In the preferred embodiment, new keys are generated every time a new message is communicated between parties. Alternatively, the key may remain the same as long as the same parties are in communication. The keys used over the course of a particular time period may be stored in the memory resident at each location, to be retrieved and recorded at a later time by a system administrator, simplifying the key management task. Alternatively, a key may be erased from memory when all communication using that particular key has ceased.

The split key scheme utilized by the system of the present invention ensures secure communication between parties, as the key does not exist until communication has already begun; even the parties to the communication do not possess the key ahead of time. The key generated for a particular communication is formed independent of any other key, adding to the security of the system. Also, the key generated for a particular communication is unique to that communication. Even if that particular key were compromised, this information would be useless when trying to decrypt subsequent communications.

The actual transfer of key components and the encrypted message may be accomplished using any well known communications channel configuration and handshaking or other message transfer method. Encryption and decryption of the message by the complete key may be accomplished using any known encryption/decryption algorithm stored in memory and applied by the cryptographic engines at the transmit and receive locations.

The description refers to two parties in communication with each other. The system of the present invention may be employed by any number of communicating parties using split keys, however. It is contemplated that any number of key components equal to the number of communicating parties may be combined to form a complete key.

The description of the present invention disclosed encrypting means at a transmit location and decrypting means at a receive location. It is important to note that an encrypting means and a decrypting means are both designed into the digital logic residing at each location. Thus, each location is capable of functioning as a transmit location or a receive location as the situation dictates. The circuitry design of the encrypting means and the decrypting means may therefore be intermingled on the same set of integrated circuit chips, or on the same integrated circuit chip if a single chip is used.

Preferred and alternate embodiments of the present invention have now been described in detail. It is to be noted, however, that this description is merely illustrative of the principles underlying the inventive concept. It is therefore contemplated that various modifications of the disclosed embodiments will, without departing from the spirit and scope of the present invention, be apparent to persons of ordinary skill in the art.

We claim:

1. A secure cryptographic communication system comprising:
   A) a communications channel;
   B) encryption means coupled to the communications channel for converting a message to be transmitted to encrypted text and for transmitting the encrypted text on the communications channel; and
   C) decryption means coupled to the communications channel for receiving the encrypted text on the communications channel and for converting the encrypted text received on the communications channel to plain text;
   D) the encryption means comprising transmit key component generating means for generating a transmit key component and transmitting means for transmitting the transmit key component to the decryption means;
   E) the decryption means comprising receive key component generating means for generating a receive key component and receiving means for receiving the transmit key component from the encryption means;
   F) the decryption means further comprising transmit key component checking means for determining the validity and transmission accuracy of the transmit key component, transmitting means for transmitting the receive key component to the encryption means, and combining means for combining the transmit key component and the receive key component to form a complete key; and
   G) the encryption means further comprising receive key component checking means for determining the validity and transmission accuracy of the receive key component, receiving means for receiving the receive key component from the decryption means, and combining means for combining the transmit key component and the receive key component to form a complete key;
   H) the encryption means using the complete key to convert the message to be transmitted to encrypted text and the decryption means using the complete key to convert the encrypted text received on the communications channel to plain text.

2. The secure cryptographic communication system of claim 1, wherein:
   A) the encryption means further comprises first memory means for storing the transmit key component and receive key component, means for generating a first pseudorandom sequence of bits and for generating a first sequence of check bits based on the first pseudorandom sequence according to a first mathematical algorithm stored in the first memory means, the first pseudorandom sequence and the first sequence of check bits together forming the transmit key component;
   B) the decryption means further comprises second memory means for storing the transmit key component and receive key component, means for generating a second pseudorandom sequence of bits and for generating a second sequence of check bits based on the second pseudorandom sequence according to a second mathematical algorithm stored in the second memory means, the second pseudorandom sequence and the second sequence of check bits together forming the receive key component;
   C) the encryption means further comprises means for separating the receive key component into the second pseudorandom sequence and the second sequence of check bits, means for generating a first sequence of test bits based on the second pseudorandom sequence according to the second mathematical algorithm stored in the first memory means, means for comparing the first sequence of test bits with the second sequence of check bits, and means for inhibiting message communication between the encryption means and the decryption means if the first sequence of test bits and the second sequence of check bits are not identical; and
   D) the decryption means further comprises means for separating the transmit key component into the first pseudorandom sequence and the first sequence of check bits, means for generating a second sequence of test bits based on the first pseudorandom sequence according to the first mathematical algorithm stored in the second memory means, means for comparing the second sequence of test bits with the first sequence of check bits, and means for inhibiting message communication between the encryption means and the decryption means if the second sequence of test bits and the first sequence of check bits are not identical.

3. The secure cryptographic communication system of claim 2, wherein the first mathematical algorithm and the second mathematical algorithm are cyclical redundancy codes.

4. The secure cryptographic communication system of claim 1, wherein the encryption means is a first digital logic circuit and the decryption means is a second digital logic circuit.

5. The secure cryptographic communication system of claim 4, wherein the first digital logic circuit is a first plurality of integrated circuit chips and the second digital logic circuit is a second plurality of integrated circuit chips.

6. The secure cryptographic communication system of claim 4, wherein the first digital logic circuit and the second digital logic circuit are a plurality of integrated circuit chips.

7. The secure cryptographic communication system of claim 4, wherein the first digital logic circuit is a first single integrated circuit chip and the second digital logic circuit is a second single integrated circuit chip.

8. The secure cryptographic communication system of claim 4, wherein the first digital logic circuit and the second digital logic circuit are a single integrated circuit chip.

9. The secure cryptographic communication system of claim 1, wherein the message is a signal selected from the group of signals consisting of digital voice signals, digital data signals, and digitized analog signals.

10. A method for establishing secure cryptographic communications comprising the following steps:
   A) generating a transmit key component at a first location;
   B) transmitting the transmit key component to a second location;
   C) receiving the transmit key component at the second location;
   D) checking the transmit key component for validity and errors at the second location;
   E) generating a receive key component at the second location;
   F) transmitting the receive key component to the first location;
   G) receiving the receive key component at the first location;
   H) checking the receive key component for validity and errors at the first location;
   I) inhibiting message communication between the first location and the second location if the transmit key component is invalid or contains errors;
   J) inhibiting message communication between the first location and the second location if the receive key component is invalid or contains errors; and
   K) enabling message communication between the first location and the second location if the transmit key component is valid and contains no errors and if the receive key component is valid and contains no errors.

11. The method for establishing secure cryptographic communications according to claim 10, further comprising the following steps if the transmit key component is valid and contains no errors and if the receive key component is valid and contains no errors:
   A) forming a complete key at the first location by combining the transmit key component with the receive key component at the first location;
   B) forming a complete key at the second location by combining the transmit key component with the receive key component at the second location;
   C) forming an encrypted message by encrypting a plain text message with the complete key at the first location;
   D) transmitting the encrypted message to the second location;
   E) receiving the encrypted message at the second location; and
   F) retrieving the plain text message by decrypting the encrypted message with the complete key at the second location.

12. The method for establishing secure cryptographic communications according to claim 10, wherein the step of generating a transmit key component at a first location comprises the steps of:
   A) generating a first pseudorandom sequence of bits at a first location;
   B) generating a first sequence of check bits based on the first pseudorandom sequence of bits according to a first mathematical algorithm; and
   C) appending the first sequence of check bits to the first pseudorandom sequence of bits.

13. The method for establishing secure cryptographic communications according to claim 10, wherein the step of generating a receive key component at a second location comprises the steps of:
   A) generating a second pseudorandom sequence of bits at a second location;
   B) generating a second sequence of check bits based on the second pseudorandom sequence of bits according to a second mathematical algorithm; and
   C) appending the second sequence of check bits to the second pseudorandom sequence of bits.

14. The method for establishing secure cryptographic communications according to claim 13, wherein the step of checking the transmit key component for validity and errors at the second location comprises the steps of:
   A) separating the transmit key component into the first pseudorandom sequence and the first sequence of check bits at the second location;
   B) generating a first sequence of test bits at the second location based on the first pseudorandom sequence of bits according to the first mathematical algorithm;
   C) comparing the first sequence of test bits to the first sequence of check bits at the second location;
   D) determining that the transmit key component is valid and accurately transmitted if the first sequence of test bits matches the first sequence of check bits identically; and
   E) determining that the transmit key component is not valid and accurately transmitted if the sequence of test bits does not match the sequence of check bits identically.

15. The method for establishing secure cryptographic communications according to claim 13, wherein the step of checking the receive key component for validity and errors at the first location comprises the steps of:
   A) separating the receive key component into the second pseudorandom sequence and the second sequence of check bits at the first location;
   B) generating a second sequence of test bits at the first location based on the second pseudorandom sequence of bits according to the second mathematical algorithm;
   C) comparing the second sequence of test bits to the second sequence of check bits at the first location;
   D) determining that the receive key component is valid and accurately transmitted if the second sequence of test bits matches the second sequence of check bits identically; and
   E) determining that the receive key component is not valid and accurately transmitted if the second sequence of test bits does not match the second sequence of check bits identically.

* * * * *

UNITED STATES PATENT AND TRADEMARK OFFICE
CERTIFICATE OF CORRECTION

PATENT NO. : 5,375,169
DATED : December 20, 1994
INVENTOR(S) : Edward M. Seheidt and John J. Crowley It is certified that error appears in the above-indentified patent and that said Letters Patent is hereby corrected as shown below:

On the title page, under item [19] delete "Seheidt" and replace with --Scheidt--; and item [75] Inventors: after "Edward M." delete "Seheidt" and replace with --Scheidt--.

Signed and Sealed this

Seventh Day of March, 1995

*Attest:*

BRUCE LEHMAN

*Attesting Officer*     *Commissioner of Patents and Trademarks*